United States Patent
Yu et al.

(10) Patent No.: US 10,303,312 B2
(45) Date of Patent: May 28, 2019

(54) FOLDABLE FLEXIBLE TOUCH SCREEN AND FLEXIBLE TOUCH DISPLAY PANEL

(71) Applicant: Wuhan China Star Optoelectronics Technology Co., Ltd., Wuhan, Hubei (CN)

(72) Inventors: Yun Yu, Hubei (CN); Bo Li, Hubei (CN); Jenyu Lee, Hubei (CN); Dinguo Chen, Hubei (CN); Yong Zhao, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 190 days.

(21) Appl. No.: 15/324,496

(22) PCT Filed: Dec. 23, 2016

(86) PCT No.: PCT/CN2016/111621
§ 371 (c)(1),
(2) Date: Jan. 6, 2017

(87) PCT Pub. No.: WO2018/086200
PCT Pub. Date: May 17, 2018

(65) Prior Publication Data
US 2018/0329530 A1    Nov. 15, 2018

(30) Foreign Application Priority Data
Nov. 8, 2016  (CN) .......................... 2016 1 0979903

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04102* (2013.01); *G06F 2203/04103* (2013.01); *G06F 2203/04111* (2013.01)

(58) Field of Classification Search
CPC .......... G06F 3/044; G06F 3/047; G06F 3/041; G06F 3/03; G06F 3/01; G06F 2203/04102; G06F 2203/04103; G06F 2203/04111; G06F 2203/04112; G06F 2203/04804; G06F 2203/041; G06F 2203/00
See application file for complete search history.

(56) References Cited

U.S. PATENT DOCUMENTS

2010/0156846 A1 * 6/2010 Long ...................... G06F 3/044
345/174

FOREIGN PATENT DOCUMENTS

CN          204028877 U    * 12/2014
CN          204143398 U    *  2/2015

* cited by examiner

*Primary Examiner* — Julie Anne Watko
(74) *Attorney, Agent, or Firm* — Muncy, Geissler, Olds & Lowe, P.C.

(57) ABSTRACT

A flexible touch screen fold along middle is provided. The flexible touch screen has a window region with a touch function, a folded section, and a non-window region for arranging leads. A part of the electrodes located at the folded section is made of transparent electrode material with a bending resistance. Because the electrodes of the folded section are made of the material with a bending resistance, the bending stress of the electrodes at the folded area of the flexible touch display panel can be improved, and the service life of the flexible touch display panel can be increased.

16 Claims, 2 Drawing Sheets

FOLDABLE FLEXIBLE TOUCH SCREEN AND FLEXIBLE TOUCH DISPLAY PANEL

FIELD OF THE INVENTION

The present disclosure relates to a technical field of displays, and in particular to a foldable flexible touch screen and a flexible touch display panel with the foldable flexible touch screen.

BACKGROUND OF THE INVENTION

In the technical field of displays, a touch panel is regarded a new input device and is already being used widely in the technical field of touch display panels. Touch panels include a resistive type touch panel, a capacitive type touch panel, an optical type touch panel, and an electromagnetic type touch panel, wherein the capacitive type touch panel has the advantages of fast reaction, reliability, high durability, and multi-touch, which is more applied in mobile terminals. With the development of flexible display technology, mobile terminals, such as mobile phones, smart watches, and smart bracelets, tend towards being light, thin, and foldable. Therefore, the touch screen of the portable terminal needs to be flexible, thin, and foldable.

The plug-in capacitive touch screen is the most used flexible touch screen, and the substrate is made of flexible plastics. The transparent conductive film electrode and the metal lead are disposed on the substrate, and affixed to the flexible touch screen. ITO (indium tin oxide) is the most used transparent electrode material, the preparation process is mature, and it has a high brittleness. When the flexible touch screen is folded, an ITO transparent induction electrode can easily generate stress concentration, cracking and expanding, which results in poor touch performance. Alternative materials can be substituted for ITO, such as silver nanowires, graphene, carbon nanotube, and conductive polymers, which have a conductive property as well as ITO, a high light transmittance, and a strong flexibility. However, the alternative materials are not in mass production, and the cost of the material synthesis is higher.

Therefore, the flexible touch screen of the prior air has low bending resistance and defective wiring caused by deformation, which influences the product quality. It is therefore necessary to provide a flexible touch screen with better bending resistance.

As a result, an improved design of a transparent conductive electrode layer of a foldable flexible touch screen achieves flexibility and reduces production cost, and solves the problems existing in the conventional technologies.

SUMMARY OF THE INVENTION

An object of the present disclosure is to provide a foldable flexible touch screen which can improve the bending stress of the electrodes when folded through changing the material of the electrodes, which thereby solves the problems of the flexible touch screen of the prior art having defective wiring caused by deformation, which causes poor product quality.

To achieve the above objects, the present disclosure provides a foldable flexible touch screen, which comprises a flexible substrate, a plurality of drive electrodes, and a plurality of sensing electrodes; the flexible substrate includes a window region, a folded section, and a non-window region, wherein the folded section is located an intermediate portion of the window region; the drive electrodes being laterally arranged in the window region; the sensing electrodes being longitudinally arranged in the window region, wherein the sensing electrodes and the drive electrodes are insulated from each other; wherein the non-window region is disposed with a first circuit board binding area located at a left portion of the folded section, and a second circuit board binding area located at a right portion of the folded section; wherein a plurality of electrode leads located at the left portion of the folded section are connected to the first circuit board binding area; a plurality of electrode leads located at the right portion of the folded section are connected to the second circuit board binding area; and a plurality of electrode leads located in the folded section are connected to the first circuit board binding area or the second circuit board binding area; wherein a part of the electrodes located at the folded section is made of transparent electrode material with a bending resistance.

In one embodiment of the present disclosure, a part of the electrode patterns located at the folded section is made of silver nanowires, conductive polymers, or graphene as an electrode material.

In one embodiment of the present disclosure, a part of the electrode patterns located at an outside of the folded section is made of indium tin oxide as an electrode material.

In one embodiment of the present disclosure, the electrode patterns located outside of the folded section and the electrode patterns located at the folded section are made of the same electrode material.

In one embodiment of the present disclosure, the drive electrodes include a plurality of first diamond electrodes and a plurality of second diamond electrodes symmetrized with the first diamond electrodes, a connecting line integrally formed between the first diamond electrodes and the second diamond electrodes, and a transparent insulating layer is disposed on the connecting line; the sensing electrodes include a plurality of third diamond electrodes and a plurality of fourth diamond electrodes symmetrized with the third diamond electrodes, wherein the first diamond electrodes and the second diamond electrodes are connected by an electrode bridge connection, and the electrode bridge connection is located on an upper surface of the transparent insulating layer.

In one embodiment of the present disclosure, the transparent insulating layer is deposited on an overlapping position of the drive electrodes and the sensing electrodes, and the transparent insulating layer is a silicon oxide thin film.

In one embodiment of the present disclosure, each of the drive electrodes and each of the sensing electrodes are connected to an end of the electrode leads, respectively; the other ends of the electrode leads is connected to the circuit board binding area; and the electrode leads are arranged in the non-window region.

To achieve the above objects, the present disclosure provides a foldable flexible touch screen, which comprises a flexible substrate, a plurality of drive electrodes and a plurality of sensing electrodes; the flexible substrate including a window region, a folded section, and a non-window region, wherein the folded section is located an intermediate portion of the window region; the drive electrodes being laterally arranged in the window region; the sensing electrodes being longitudinally arranged in the window region, wherein the sensing electrodes and the drive electrodes are insulated from each other; wherein a part of the electrodes located at the folded section is made of transparent electrode material with a bending resistance.

In one embodiment of the present disclosure, a part of the electrode patterns located at the folded section is made of silver nanowires, conductive polymers, or graphene as an electrode material.

In one embodiment of the present disclosure, a part of the electrode patterns located outside of the folded section are made of indium tin oxide as an electrode material.

In one embodiment of the present disclosure, the electrode patterns located outside of the folded section and the electrode patterns located at the folded section are made of the same electrode material.

In one embodiment of the present disclosure, the drive electrodes include a plurality of first diamond electrodes and a plurality of second diamond electrodes symmetrized with the first diamond electrodes, a connecting line integrally formed between the first diamond electrodes and the second diamond electrodes, and a transparent insulating layer is disposed on the connecting line; the sensing electrodes include a plurality of third diamond electrodes and a plurality of fourth diamond electrodes symmetrized with the third diamond electrodes, wherein the first diamond electrodes and the second diamond electrodes are connected by an electrode bridge connection, and the electrode bridge connection is located on an upper surface of the transparent insulating layer.

In one embodiment of the present disclosure, each of the drive electrodes and each of the sensing electrodes are connected to an end of the electrode leads, respectively; the other ends of the electrode leads are connected to the circuit board binding area; and the electrode leads are arranged in the non-window region.

To achieve the above objects, the present disclosure provides a flexible touch display panel, which comprises a flexible display panel and a foldable flexible touch screen located on the flexible display panel and electrical connected to the flexible display panel; wherein the folded flexible touch screen includes a flexible substrate, a plurality of drive electrodes, and a plurality of sensing electrodes; the flexible substrate includes a window region, a folded section, and a non-window region, wherein the folded section is located an intermediate portion of the window region; the drive electrodes being laterally arranged in the window region; the sensing electrodes being longitudinally arranged in the window region, wherein the sensing electrodes and the drive electrodes are insulated from each other; wherein a part of the electrodes located at the folded section is made of transparent electrode material with a bending resistance.

In one embodiment of the present disclosure, a part of the electrode patterns located at the folded section is made of silver nanowires, conductive polymers, or graphene as an electrode material.

In one embodiment of the present disclosure, each of the drive electrodes and each of the sensing electrodes are connected to a plurality of electrode leads, respectively; the flexible display panel is disposed with a first circuit board binding area located at a left portion of the folded section; a second circuit board binding area is located at a right portion of the folded section; the electrode leads located at the left portion of the folded section are connected to the first circuit board binding area; the electrode leads located at the right portion of the folded section are connected to the second circuit board binding area; the electrode leads located at the folded section are connected to the first circuit board binding area or second circuit board binding area.

The beneficial effect of the present disclosure compared with the prior art is that the electrodes of the folded section are made of a material with a bending resistance in the flexible touch display panel, so that the bending stress of the electrodes at the folded area of the flexible touch display panel can be improved, and the service life of the flexible touch display panel can be increased, thereby solving the problems of the flexible touch screen of the prior air comprising low bending resistance, defective wiring caused by deformation, and poor product quality.

DESCRIPTION OF THE DRAWINGS

In order to more clearly illustrate the embodiments or the prior art technical solutions embodiment of the present disclosure, will implement the following figures for the cases described in the prior art or require the use of a simple introduction. Obviously, the following description of the drawings are only some of those of ordinary skill in terms of creative effort without precondition, you can also obtain other drawings based on these drawings embodiments of the present disclosure.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc. are only directions by referring to the accompanying drawings, and thus the used directional terms are used to describe and understand the present invention, but the present invention is not limited thereto.

The present disclosure is compared with a conventional flexible touch screen, the problem that the stress which generates abrasions or breakage of the electrodes affects the touch effect of the flexible touch screen when the flexible touch screen is folded can be overcome.

Figure 1:
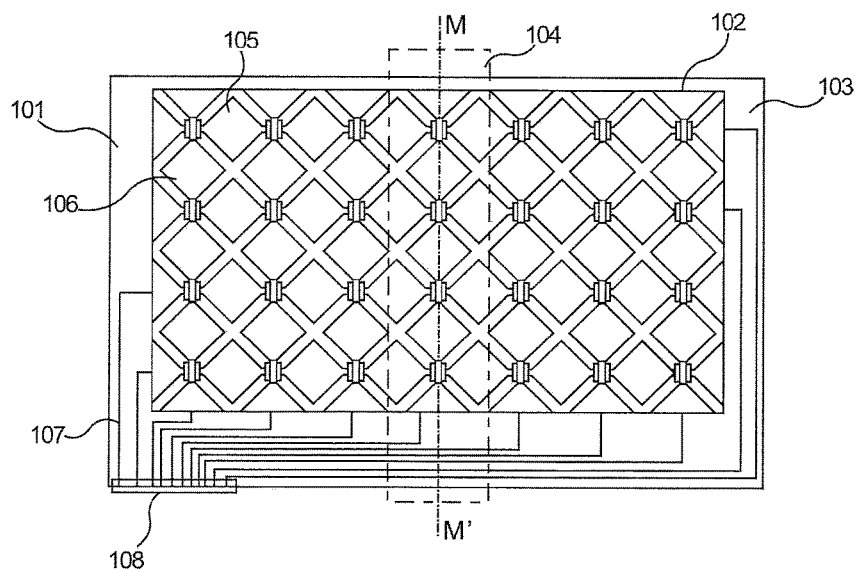
FIG. 1 is a schematic view of a structure of a flexible touch screen of the present disclosure.

Refer to FIG. 1, a flexible touch screen of the present disclosure comprises a flexible substrate 101, and a window region 102 is defined on the flexible substrate 101 corresponding to a display area of a display panel. Outside of the window region 102 is a non-window region 103, and a folded section 104 is located an intermediate portion of the window region 102. The flexible touch screen can be folded along a centerline M-M' on the window region 102. The folded section 104 is located at a folded area near centerline M-M' when the flexible touch screen is folded.

The window region 102 is disposed with a plurality of drive electrodes 105 and a plurality of sensing electrodes 106, wherein the drive electrodes 105 are laterally arranged, and the sensing electrodes 106 are longitudinally arranged, and the drive electrodes 105 and the sensing electrodes 106 are insulated from each other.

The drive electrodes 105 and the sensing electrodes 106 are connected to an end of electrode leads 107, respectively, and the electrode leads 107 are arranged in the non-window region 103, and the other ends of the electrode leads 107 are connected to a circuit board binding area 108 to communicate and control a chip.

A part of the electrode patterns located at the folded section 104 is made of a transparent electrode material with a bending resistance, such as silver nanowires, conductive polymers, or graphene as an electrode material, so that the bending resistance of the flexible touch screen can be increased.

Figure 2:
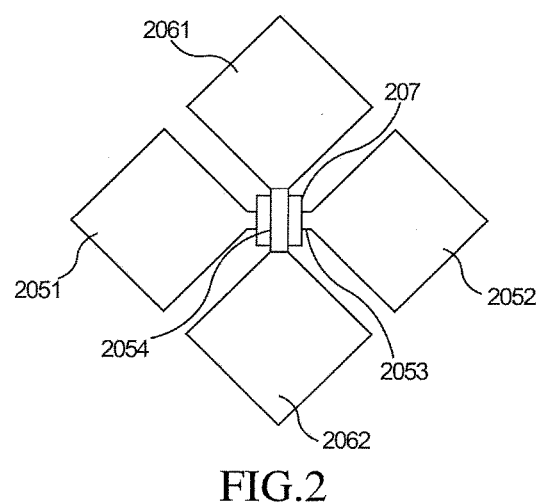
FIG. 2 is a schematic view of an electrode structure of a flexible touch screen of the present disclosure.

Refer to FIG. 2, which is a schematic view of touch electrodes including a plurality of drive electrodes and a plurality of sensing electrodes. The drive electrodes include a plurality of first diamond electrodes 2051 and a plurality of second diamond electrodes 2052 symmetrized with the first diamond electrodes 2051, a connecting line 2053 is integrally formed between the first diamond electrodes 2051 and the second diamond electrodes 2052, and a transparent insulating layer 207 is disposed on the connecting line 2053. The sensing electrodes include a plurality of third diamond electrodes 2061 and a plurality of fourth diamond electrodes 2062 symmetrized with the third diamond electrodes 2061, wherein the first diamond electrodes 2051 and the second diamond electrodes 2051 are connected by an electrode bridge connection 2054, and the electrode bridge connection 2054 is located on an upper surface of the transparent insulating layer 207.

Preferably, the transparent insulating layer 207 is deposited on an overlapping position of the drive electrodes and the sensing electrodes, and the transparent insulating layer 207 is a silicon oxide thin film deposited by PECVD (Plasma Enhanced Chemical Vapor Deposition) with a thickness of about 50 nm.

The technical solution of the present disclosure can be realized by the following embodiments.

Embodiment 1

A preparation process of the flexible touch screen of the embodiment includes:

Step 1, disposing a flexible substrate.

Step 2, disposing a transparent conductive capacitive sensing layer made of ITO (indium tin oxide) on the window region of the flexible substrate, and graphing the transparent conductive capacitive sensing layer.

Step 3, disposing an electrode bridge connection and electrode leads in the folded section by a common material, such as a metal line of copper or silver material, and processing through AL (wet etching) or PVD (Physical vapor deposition).

Step 4, etching the ITO transparent electrode layer in the folded section.

Step 5, coating with a bending resistance silver nanowires, conducting polymer, or graphene polymer layer in the folded section, and etching by laser to form electrodes with patterns.

Step 6, disposing electrode bridge connections and electrode leads made of in the bending resistance in folded section.

In the flexible touch screen of the present disclosure, the electrode and electrode leads located in folded section and the electrode and electrode leads located outside of the folded section are disposed by different materials, respectively, wherein the electrode and electrode leads located in the folded section are disposed by the material with a bending resistance, and the electrode and electrode leads located at other areas are disposing by common metal materials, so that the problems of defective wiring caused by deformation or fracture of the electrode and electrode leads can be overcome.

Embodiment 2

A preparation process of the flexible touch screen of the embodiment includes:

Step 1, disposing a flexible substrate.

Step 2, disposing a transparent conductive capacitive sensing layer made of ITO (indium tin oxide) in the window region of the flexible substrate, and graphing the transparent conductive capacitive sensing layer.

Step 3, etching the ITO transparent electrode layer in the folded section.

Step 4, coating with a bending resistance silver nanowires, conducting polymer, or graphene polymer layer in the folded section, and etching by laser to form electrodes with pattern.

Step 5, disposing electrode bridge connections in a surface of the window region, and disposing electrodes at a periphery of the window region, wherein the electrode bridge connections and the electrode leads are disposed by a material with a bending resistance.

In the flexible touch screen of the present disclosure, a step of disposing electrode bridge connections and electrode leads can be omitted. So that the process can be simplified, and the problems of defective wiring caused by deformation or fracture of the electrode and electrode leads can be reduced.

Embodiment 3

Figure 3:
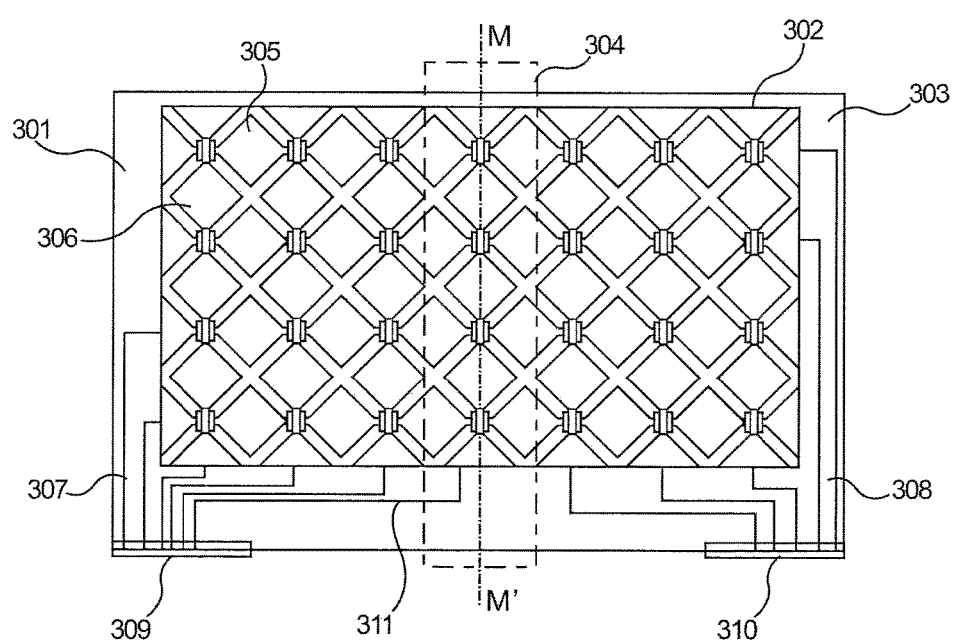
FIG. 3 is a schematic view of a structure of a flexible touch screen of the present disclosure.

Refer to FIG. 3, a flexible touch screen of the present disclosure comprises a flexible substrate 301, and a window region 302 is defined on the flexible substrate 301 corresponding to a display area of a display panel. Outside of the window region 302 is a non-window region 303, and a folded section 304 is located an intermediate portion of the window region 302. The flexible touch screen can be folded along a centerline M-M' in the window region 302. The folded section 304 is located at a folded area near centerline M-M' when the flexible touch screen is folded.

The window region 302 is disposed with a plurality of drive electrodes 305 and a plurality of sensing electrodes 306, wherein the drive electrodes 305 are laterally arranged, and the sensing electrodes 306 are longitudinally arranged, and the drive electrodes 305 and the sensing electrodes 306 are insulated from each other.

The drive electrodes 305 are connected to an end of first electrode leads 307, and the sensing electrodes 106 are connected to an end of second electrode leads 308, the first electrode leads 307 and the second electrode leads 308 are arranged in the non-window region 303, and the other ends of the first electrode leads 307 are connected to a first circuit board binding area 309, and the other ends of the second electrode leads 308 are connected to a second circuit board binding area 310 to communicate and control a chip.

A periphery of the flexible substrate 301 is disposed with the first circuit board binding area 309 and the second circuit board binding area 310. The first circuit board binding area 309 is located at a left portion of the folded section 304, and the second circuit board binding area 310 is located at a right portion of the folded section 304, wherein the first electrode leads 307 located at the left portion of the folded section 304 are connected to the first circuit board binding area 309, and the second electrode leads 307 located at the right portion of the folded section 304 are connected to the second circuit board binding area 310, and a plurality of third electrode leads 311 located at the folded section 304 are connected to the first circuit board binding area 309 or the second circuit board binding area 310.

In the flexible touch screen of the present disclosure, the second electrode leads 307 are disposed on the surface of the flexible substrate 301 to avoid being disposed on the folded section 304, so that the second electrode leads 307 prevent to be folded for a long time, and the third electrode leads 311 of the folded section 304 can avoid being deformed from bending stress and being shorted from fracture. The product quality can be improved by disposing the first circuit board binding area 309 and the second circuit board binding area 310 and without disposing any leads through the folded section 304.

To achieve the above objects, the present disclosure provides a flexible touch display panel, which comprises a flexible display panel, and a foldable flexible touch screen located on the flexible display panel and electrical connected to the flexible display panel, wherein the folded flexible touch screen includes a flexible substrate, a plurality of drive electrodes and a plurality of sensing electrodes, the flexible substrate includes a window region, a folded section, and a non-window region, wherein the folded section is located an intermediate portion of the window region, the drive electrodes are laterally arranged in the window region, the sensing electrodes are longitudinally arranged in the window region, wherein the sensing electrodes and the drive electrodes are insulated from each other, and a part of the electrodes located at the folded section is made of transparent electrode material with a bending resistance.

In one embodiment of the present disclosure, a part of the electrode patterns located at the folded section is made of silver nanowires, conductive polymers, or graphene as an electrode material.

In one embodiment of the present disclosure, each of the drive electrodes and each of the sensing electrodes are connected to a plurality of electrode leads, respectively; the flexible display panel is disposed with a first circuit board binding area located at a left portion of the folded section; a second circuit board binding area is located at a right portion of the folded section; the electrode leads located at the left portion of the folded section are connected to the first circuit board binding area; electrode leads located at the right portion of the folded section are connected to the second circuit board binding area; and electrode leads located in the folded section are connected to the first circuit board binding area or second circuit board binding area.

The working principle of the flexible touch display panel of the preferred embodiment and the working principle of the flexible touch screen of the preferred embodiment are the same, which can refer said above description.

The beneficial effect of the present disclosure compared with the prior art is that the electrodes of the folded section are made of a material with a bending resistance in the flexible touch display panel, so that the bending stress of the electrodes at the folded area of the flexible touch display panel can be improved, and the service life of the flexible touch display panel can be increased, thereby solving the problems of the flexible touch screen of the prior air comprising low bending resistance, defective wiring caused by deformation, and poor product quality.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A foldable flexible touch screen, comprising:
    a flexible substrate including a window region, a folded section, and a non-window region, wherein the folded section is located at an intermediate portion of the window region;
    a plurality of drive electrodes laterally arranged in the window region; and
    a plurality of sensing electrodes longitudinally arranged in the window region, wherein the sensing electrodes and the drive electrodes are insulated from each other;
    wherein the non-window region is disposed with a first circuit board binding area located at a left portion of the folded section, and a second circuit board binding area located at a right portion of the folded section;
    wherein a plurality of electrode leads located at the left portion of the folded section are connected to the first circuit board binding area; a plurality of electrode leads located at the right portion of the folded section are connected to the second circuit board binding area; and a plurality of electrode leads located at the folded section are connected to the first circuit board binding area or the second circuit board binding area;
    wherein a part of the sensing electrodes and the drive electrodes located at the folded section is made of transparent electrode material with a bending resistance.

2. The foldable flexible touch screen according to claim 1, wherein a part of electrode patterns of the sensing electrodes and the drive electrodes located at the folded section is made of silver nanowires, conductive polymers, or graphene as an electrode material.

3. The foldable flexible touch screen according to claim 2, wherein a part of the electrode patterns located at an outside of the folded section is made of indium tin oxide as an electrode material.

4. The foldable flexible touch screen according to claim 2, wherein the electrode patterns located outside of the folded section and the electrode patterns located at the folded section are made of the same electrode material.

5. The foldable flexible touch screen according to claim 1, wherein the drive electrodes include a plurality of first diamond electrodes and a plurality of second diamond electrodes symmetrized with the first diamond electrodes, a connecting line integrally formed between the first diamond electrodes and the second diamond electrodes, and a transparent insulating layer is disposed on the connecting line; and
    the sensing electrodes include a plurality of third diamond electrodes and a plurality of fourth diamond electrodes symmetrized with the third diamond electrodes, wherein the third diamond electrodes and the fourth diamond electrodes are connected by an electrode bridge connection, and the electrode bridge connection is located on an upper surface of the transparent insulating layer.

6. The foldable flexible touch screen according to claim 5, wherein the transparent insulating layer is disposed on an overlapping position of the drive electrodes and the sensing electrodes, and the transparent insulating layer is a silicon oxide thin film.

7. The foldable flexible touch screen according to claim 1, wherein each of the drive electrodes and each of the sensing electrodes are connected to an end of the electrode leads, respectively; the other ends of the electrode leads are connected to a circuit board binding area; and the electrode leads are arranged in the non-window region.

8. A foldable flexible touch screen, comprising:
a flexible substrate including a window region, a folded section, and a non-window region, wherein the folded section is located at an intermediate portion of the window region;
a plurality of drive electrodes laterally arranged in the window region; and
a plurality of sensing electrodes longitudinally arranged in the window region, wherein the sensing electrodes and the drive electrodes are insulated from each other;
wherein a part of the sensing electrodes and the drive electrodes located at the folded section is made of transparent electrode material with a bending resistance.

9. The foldable flexible touch screen according to claim 8, wherein a part of electrode patterns of the sensing electrodes and the drive electrodes located at the folded section is made of silver nanowires, conductive polymers, or graphene as an electrode material.

10. The foldable flexible touch screen according to claim 9, wherein a part of the electrode patterns located outside of the folded section are made of indium tin oxide as an electrode material.

11. The foldable flexible touch screen according to claim 9, wherein the electrode patterns located outside of the folded section and the electrode patterns located at the folded section are made of the same electrode material.

12. The foldable flexible touch screen according to claim 8, wherein the drive electrodes include a plurality of first diamond electrodes and a plurality of second diamond electrodes symmetrized with the first diamond electrodes, a connecting line integrally formed between the first diamond electrodes and the second diamond electrodes, and a transparent insulating layer is disposed on the connecting line; and
the sensing electrodes include a plurality of third diamond electrodes and a plurality of fourth diamond electrodes symmetrized with the third diamond electrodes, wherein the third diamond electrodes and the fourth diamond electrodes are connected by an electrode bridge connection, and the electrode bridge connection is located on an upper surface of the transparent insulating layer.

13. The foldable flexible touch screen according to claim 8, wherein each of the drive electrodes and each of the sensing electrodes are connected to an end of a plurality of electrode leads, respectively; the other ends of the electrode leads are connected to a circuit board binding area; and the electrode leads are arranged in the non-window region.

14. A flexible touch display panel, comprising:
a flexible display panel;
a foldable flexible touch screen located on the flexible display panel and electrical connected to the flexible display panel;
wherein the folded flexible touch screen includes:
a flexible substrate including a window region, a folded section, and a non-window region, wherein the folded section is located at an intermediate portion of the window region;
a plurality of drive electrodes laterally arranged in the window region; and
a plurality of sensing electrodes longitudinally arranged in the window region, wherein the sensing electrodes and the drive electrodes are insulated from each other;
wherein a part of the sensing electrodes and the drive electrodes located at the folded section is made of transparent electrode material with a bending resistance.

15. The flexible touch display panel, according to claim 14, wherein a part of electrode patterns of the sensing electrodes and the drive electrodes located at the folded section is made of silver nanowires, conductive polymers, or graphene as an electrode material.

16. The flexible touch display panel, according to claim 14, wherein each of the drive electrodes and each of the sensing electrodes are connected to a plurality of electrode leads, respectively; the flexible display panel is disposed with a first circuit board binding area located at a left portion of the folded section; a second circuit board binding area is located at a right portion of the folded section; the electrode leads located at the left portion of the folded section are connected to the first circuit board binding area; electrode leads located at the right portion of the folded section are connected to the second circuit board binding area; and electrode leads located at the folded section are connected to the first circuit board binding area or second circuit board binding area.

* * * * *